Oct. 21, 1969 A. J. FINK 3,474,004
DISPOSABLE CULTURE DEVICE
Filed Sept. 21, 1967 3 Sheets-Sheet 1
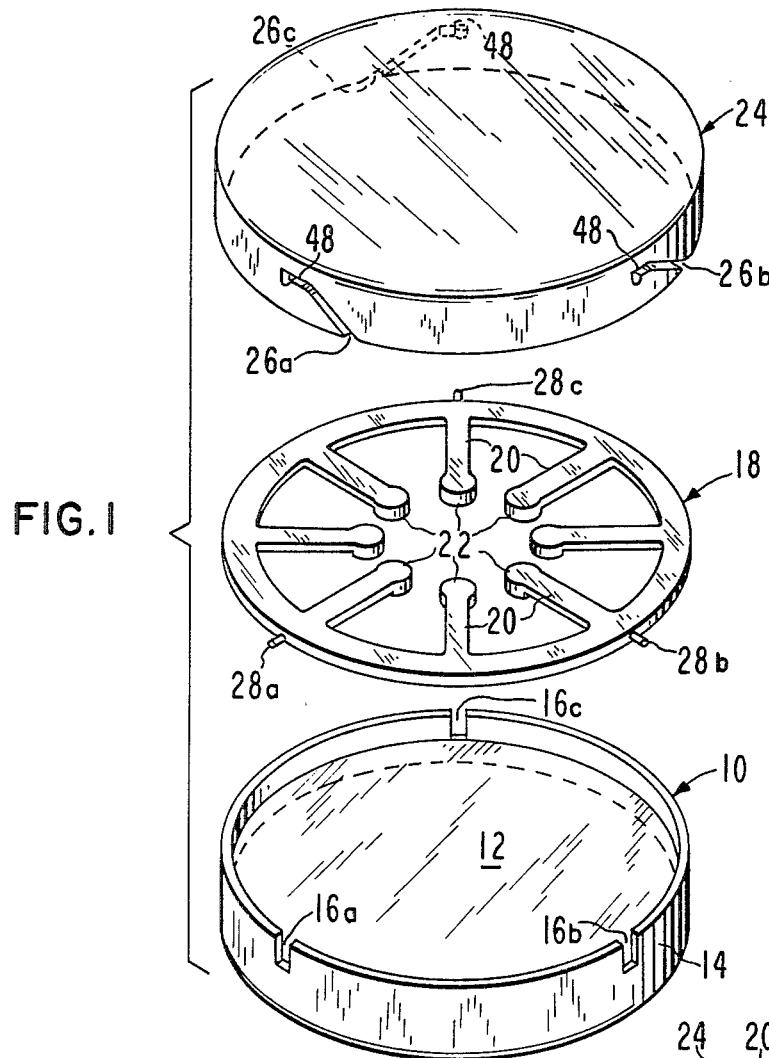
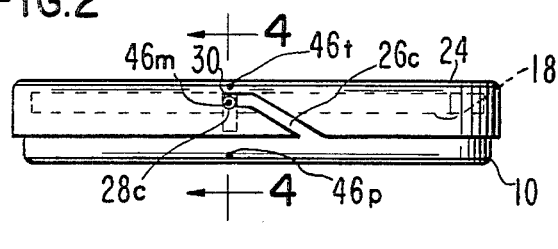
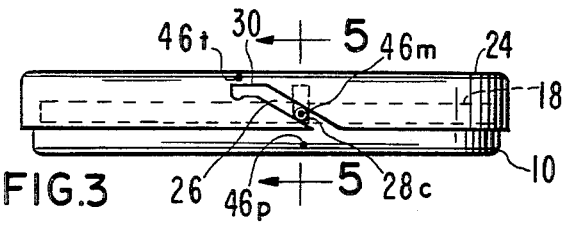
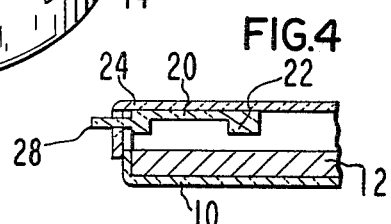
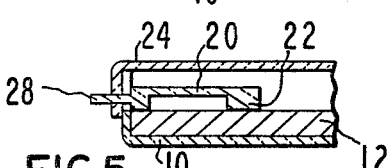
INVENTOR.
AARON J. FINK

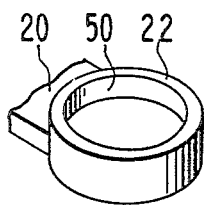
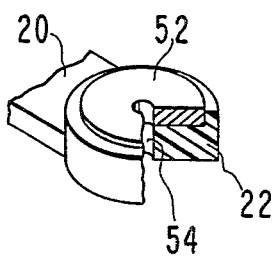
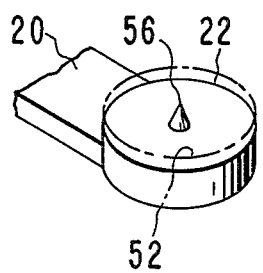
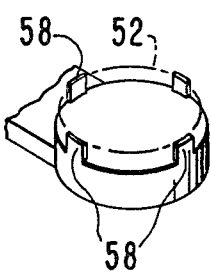
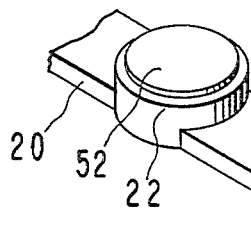
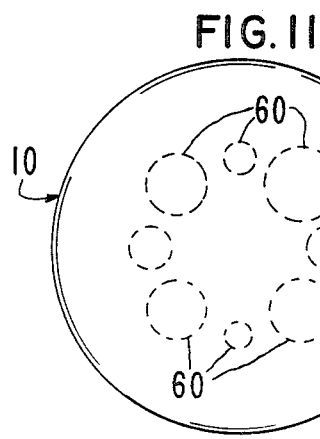
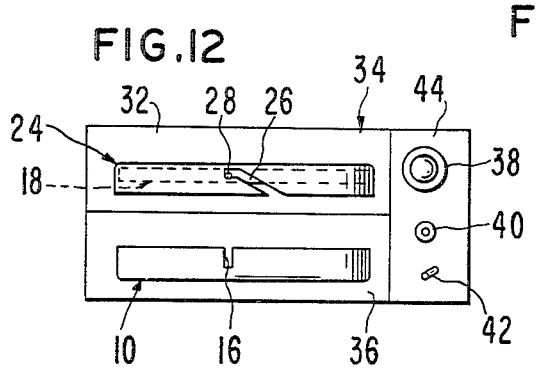
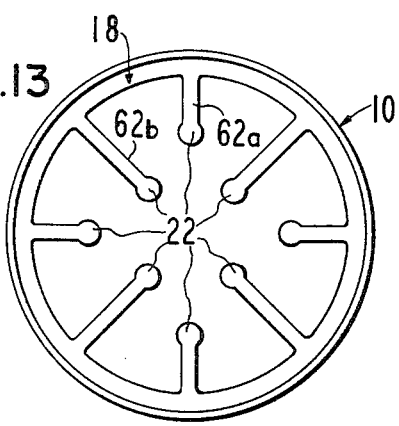

Oct. 21, 1969    A. J. FINK    3,474,004
DISPOSABLE CULTURE DEVICE
Filed Sept. 21, 1967    3 Sheets-Sheet 3

INVENTOR.
AARON J. FINK

United States Patent Office 3,474,004
Patented Oct. 21, 1969

3,474,004
DISPOSABLE CULTURE DEVICE
Aaron J. Fink, 614 Springer Terrace,
Los Altos, Calif. 90014
Filed Sept. 21, 1967, Ser. No. 669,471
Int. Cl. C12k 1/10
U.S. Cl. 195—139
13 Claims

ABSTRACT OF THE DISCLOSURE

A disposable culture device for testing the sensitivity of microbic cultures to antibiotics incorporates a holder having a multiplicity of arms for securing antibiotic disks. The device is configured to afford control of the holder for simultaneous, coplanar engagement of all of the disks with a culture medium, and for facile retraction of the disk holder.

BACKGROUND OF THE INVENTION

Field of the invention

This invention relates to a disposable culture device, and in particular to an antibiotic sensitivity disk plate.

Description of the prior art

At present, it is well known by many eminent medical authorities that the conditions for conducting sensitivity tests to determine microbic susceptibility to antibiotics are poorly controlled and subject to many variables. Even when properly conducted, some techniques are too laborious and time-consuming for clinical use. For example, the tube dilution method employs a series of tubes containing liquid culture media and serial amounts of a single antibiotic concentration, each of which is inoculated with the sample to be tested. Only a single bacterial strain and one antibiotic are tested for each series of tubes. Also, every feature of the test, such as the method of preparation and the size of the inoculum, the composition and amount of the culture medium, and the period of incubation must be standardized relative to each tube, in order to obtain consistent and significant results.

Another accepted method employs paper disks treated with an antibiotic of known concentration. Multiple similar disks are packaged in a sealed single antibiotic disk container, which once opened and removed from refrigeration, subjects the remaining unused disks to exposure and to changes in humidity, as well as other varying ambient conditions. Further, a multiplicity of different antibiotic containers must be readily available, handled and positioned for use. Proper storage is another recognized problem, and shelf life can be short. Also, when the disks are being dispensed onto the surface of a seeded culture medium, either by sterilized individual forceps handling or free fall multiple disk dropping devices, mechanical problems are introduced whereby the disks are not uniformly spaced from each other or from the edge of the plate, when seated on the surface of the medium. This can lead to incomplete, irregular, merging zones and misleading results. Furthermore, the use of the same dropping device for use with pathogenic bacteria introduces a safety hazard to personnel and can create undesired plate contamination. In addition, the disks may be skewed so that they do not make full and uniform contact with the medium, thereby creating "duds." Another problem arises when the plate is inverted for incubation, in that some disks may fall off the medium and require repositioning. Such repositioning and readjustment is commonly accomplished manually with forceps, which is tedious and takes additional time. Also, measurement of the disk inhibition zones is generally made with the aid of a ruler or caliper in millimeter gradations, and subjective errors by the observer are common and may result in an erroneous evaluation. It is apparent that in order to achieve standardization and valid evaluation, many difficulties need to be overcome. The Expert Committee on antibiotics of the World Health Organization in 1901 and other eminent authorities all continue to stress the need for standardization.

SUMMARY OF THE INVENTION

An object of this invention is to provide a novel and improved antibiotic sensitivity test device.

Another object of this invention is to provide an antibiotic disk plate that affords standardization and convenience of technique, with a minimization of performance and evaluation error.

According to this invention, an antibiotic disk device for determining the sensitivity of microbic cultures comprises a container or plate for containing a culture medium, a close fitting cover to enclose the medium plate, and a spoked holder that secures a plurality of antibiotic disks positioned in a coplanar array. The cover is formed with angular grooves that cooperate with guides in the periphery of the holder, so that the disks secure in the holder spokes may be urged by rotary action into contact with the level surface of the solid medium in the plate. The plate has slots to control and limit the travel and descent of the disk holder so that the planar array of the disks make simultaneous and complete contiguous contact with the surface of the medium. Once in contact, the assembly may be inverted for incubation, and the disks will remain in position in uniform contact with the medium surface. As an additional feature, measurement zones are inscribed for each disk on the base of the medium plate, so that a rapid observation of the size of each inhibition zone that is developed may be made.

BRIEF DESCRIPTION OF THE DRAWING

The invention will be described in greater detail with reference to the drawing in which:

FIGURE 1 is an exploded view of the packaged disposable antibiotic disk sensitivity test device of this invention;

FIGURE 2 is a side view of the assembled device prior to engagement of the disks with the culture medium;

FIGURE 3 is a side view of the assembled device after rotation of the cover relative to the plate, with the disks lowered to the medium surface;

FIGURE 5 is a side sectional view, partly broken away, of the assembled device, taken along lines 5—5 of FIG. 3;

FIGURES 6–10 of fragmentary views are different types of disk holder arms, useful with this invention;

FIGURE 11 illustrates an array of measurement zones inscribed on the test plate;

FIGURE 12 is a plan view of a package assembly of the inventive test device;

FIGURE 13 is a plan view of another embodiment of a disk holder, in accordance with this invention; and FIGURE 14 is a perspective view of the package assembly shown in FIG. 12.

Similar numerals refer to similar elements throughout the drawing.

DETAILED DESCRIPTION OF PREFERRED EMBODIMENTS

Figure 4:
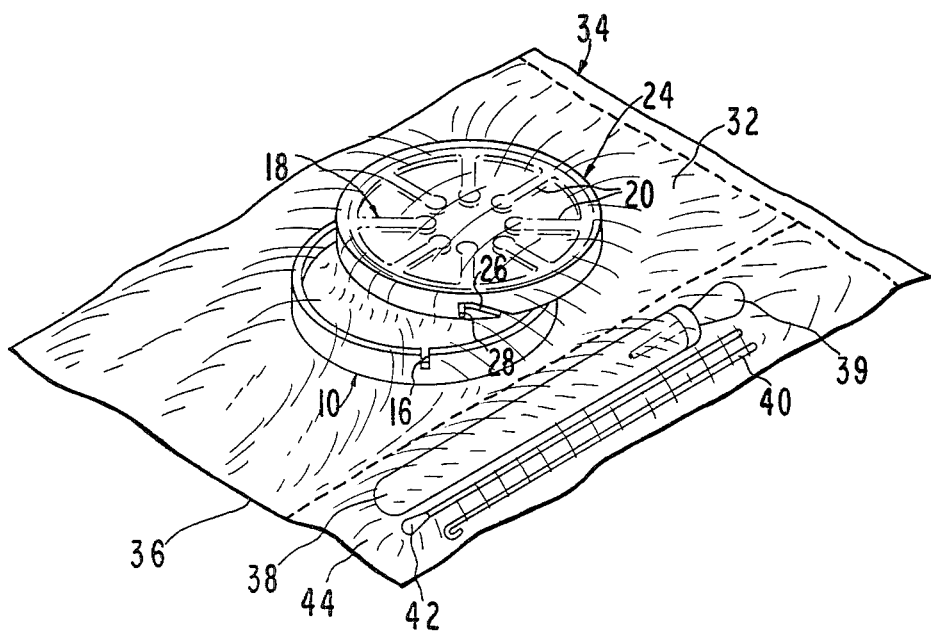
FIGURE 4 is a side sectional view, partly broken away, of the assembled device, taken along lines 4—4 of FIG. 2.

With reference to FIG. 1, an antibiotic disk sensitivity test device, according to this invention, comprises a cylindrical plate 10 in which there is disposed a solid agar culture medium 12. The circular wall 14 of the plate 10 has three vertical slots 16a, b, c that are notched substantially vertically to a depth that is close to but slightly above the surface level of the medium 12. Two of the slots 16 (a,b) are about 90° apart, and the third slot 16c is approximately 135° from the other two. By way of example, the cylindrical wall 14 may be one-half inch in height, and the slots 16 half of this height. In this manner the bases of the slots 16 lie in a substantially circular plane, which is spaced a discrete distance from the surface of the agar medium 12.

The novel sensitivity test device disclosed herein also includes a disk-like holder 18 formed with a plurality of spokes 20, each having, at the hub of the holder 18, a dish-like portion or receptacle 22 in which an antibiotic disk may be firmly secured. In the embodiment of FIG. 1, the spokes 20 are uniformly spaced and are coplanar, so that when a multiplicity of antibiotic disks are set in the receptacles 22, the disks also are evenly spaced and lie substantially in the same plane. Therefore, it is possible to move all of the coplanar disks simultaneously relative to the central axis of the holder 18, so that the disks may be seated at the same instant contiguous to a parallel plane, such as the surface presented by the culture medium 12. In this way, the difficulty of ensuring proper and uniform disk to medium contact, experienced in the prior art, may be overcome.

The novel antibiotic disk sensitivity test device of this invention further includes a cover section 24, having a depending cylindrical side wall which serves to engage the disk holder 18. The wall of the cover 24 is formed with grooves 26a, b, c which cooperate with prongs 28a, b, c formed on the periphery of the holder disk 18. The prongs 28 and grooves 26 are spaced respectively in the same relationship as the slots or notches 16 found in the plate wall 14. The cylindrical cover 24 has a base diameter a little larger than the cylindrical plate 10, so that the cover may be mounted to the plate in close-fitting relation yet enabling relative rotation.

When shelf-stocked prior to use, the holder 18 is engaged only with cover 24, the prongs 28 resting respecttively on horizontal portions 30 of the grooves 26 as shown in FIGS. 12 and 14. The assembled cover 24 and holder 18 are in an airtight, sealed compartment 32 of a container 34, which may be a plastic bag for example. The culture plate 10 with the agar medium 12 is disposed in a separate compartment 36 of the container 34. For the convenience of the practitioner or laboratory technician, a sterile test tube 38 with incubation liquid broth and dropper 39, a transfer loop 40, and a cotton swab stick 42 may be supplied additionally in a third compartment 44 of the sealed plastic container 34.

In one approach to sensitivity testing, a sample portion is obtained by means of the dropper 39, and a measured quantity of the sample is deposited directly onto the surface of the culture medium 12. The deposited sample is then spread uniformly across the medium surface by a dally stick. In an alternative technique, the cotton swab 42 is dipped into the sample and then stroked across the culture medium 12 to initiate bacterial growth on the culture plate.

A conventional procedure that is commonly followed first grows bacterial colonies on an agar plate to achieve a pure culture. The laboratory technician or practitioner then employs the looped stick 40 to transfer the selected colony or colonies to a nutrient broth contained in a test tube 38. The colonies are incubated, say 1–4 hours, until a desired degree of turbidity is reached, indicating a growth of $10^5$ to $10^6$ bacteria per milliliter. The swab 42 is then dipped into the broth and applied evenly across the culture inoculating the medium 12. Alternatively, transfer from the broth to the plate 10 may be effected by the dropper 39 to deposit an exact volume of specimen, which is then distributed evenly across the surface of the medium 12.

To allow the application of the specimen to the plate 10, the parts are removed from the container 34 under sterile conditions, and a sample of the substance to be tested, such as bacterial colonies, is transferred and deposited in the sterile broth test tube 38, which may be optionally supplied with the test device. A sample portion is taken by absorption onto the cotton swab, 42, for example, and swabbed evenly onto the entire surface of the medium 12. Some authorities recommend use of a calibrated dropper to deliver a set volume of inoculum to the surface of the culture medium 12. Thereafter, the sample specimen is spread across the surface of the culture medium 12.

The unit comprising the cover 24 and holder disk 18 is then placed onto the culture plate 10 with the holder 18 and disks spaced from the surface of the medium 12. To enable rapid alignment of the assembly parts, the groove 26c, prong 28c and slot 16c are marked with references 46t, 46m, 46p, as depicted in FIG. 2. With the reference marks 46 collinear, the prong 28c is in alignment with the slot 16c, and the prongs 28 are seated in the horizontal portions 30 of the grooves 26.

The cover section 24 is then rotated clockwise, and the prongs 28 of the holder 18 descend in the vertical slots 16 as the cover 24 rides up on the prongs 28, as illustrated in FIG. 3. This screw-type action is effectuated by means of the angular grooves 26, which guide the cover 24 upwards and away from the medium plate 14. The angle of the grooves 26, which may be a 30° slope by way of example, provides control of the movement of the spaced prongs 28, and as a result, also controls the movement of the disk holder 18 towards the culture medium 12. The bases of the slots 16 determine the lower limit of travel of the holder 18, while the horizontal portions 30 of the grooves 26 establish the upper limit. The spokes 20 are so dimensioned that all of the disks set in the receptacles 22 make uniform and continuous contact with the surface of the medium 12 in the plate 10.

In FIG. 6, the holder portion 22 comprises a recess 50 in which an antibiotic disk may be seated and retained by friction fit. The disks which are substantially of the same thickness, protrude from the recess 50 so that only the disks contact the culture medium 12, while the spokes 20 and holder portion 22 are out of contact with the medium 12.

FIG. 1 represents a disk 52 friction seated in the recess 50, as in FIG. 6, but formed with a central aperture 54 through the disk 52 and receptacle 22. The aperture 54 allows the introduction of inoculum, or other substance, when so desired, to the culture without removal of the disk holder assembly 18 from contact with the medium 12.

In FIG. 8, the holder portion 22 is formed with a projecting conical tip 56 that serves to retain the antibiotic disk in fixed position, and also provides an anaerobic penetration of the culture medium 12 for testing certain strains of bacteria, which reproduce more readily in the absence of air.

FIG. 9 illustrates another embodiment of a disk holder wherein spaced arcuate posts 58, arrayed in a circle, serve to clamp the disk 52 in the receptacle recess 50.

In FIG. 10, a spoke 20 incorporates a pair of disks 52 seated in receptacles 22 disposed along the same radius of the holder 18. With such an arrangement, an increase in concurrent testing is obtained with the same test device.

In order to obtain a rapid visual indication of the effectiveness of an antibiotic, the base of the transparent plate 10 has a series of circular measurement zones 60 inscribed thereon. The configuration of the zone marks 60 correspond to the arrangement of the disks 52 and their receptacles 22, such as illustrated in FIG. 1.

After a suitable period of incubation, during which the test device is set with the marked plate surface up and the cover beneath, a reading of the scribed circles may be made to determine which antibiotics have been effective against the particular bacteria specimen. If the circular zone is clear, then the bacteria are deemed to be sensitive to the antibiotic associated with that zone. If the test area is cloudy indicating bacterial growth, then the bacteria are considered resistant to the specific antibiotic.

Each measuring zone may be marked with a symbol, numeral or color code representing a particular antibiotic. Thus a quick visual evaluation of several antibiotics may be accomplished with the same single procedure.

In FIG. 13, an alternative arrangement of a disk holder is depicted, in which the spokes 62 vary in length, the shorter spokes 62a lying in one circular path, whereas the spokes 62b are disposed in a smaller circular path. By staggering the placement of the receptacles 22, additional or larger zones may be allotted for each antibiotic under test.

The sealed, partitioned package 34 is advantageous in that it contains all the necessary elements for conducting a sensitivity test. The sealed, air-tight package prevents undue evaporation of the moisture content of the culture medium or agar, thereby prolonging the useful life of the test device. The elements are unassembled and packed in separate compartments for the convenience of the practitioner. The plastic bag 34 may be used for safe discard of the used elements; or may be resealed with culture specimens or the like for mailing to a laboratory or medical institution for further study or use. Various types of antibiotics, in one or more holders, may also be included in the same package, allowing the practitioner a choice or selection of the antibiotics to be utilized. Also, the entire package and its parts are relatively inexpensive and therefor disposable after use.

It should be noted that the scope of the invention is not limited to the particular embodiments disclosed above. For example, the disks may be impregnated with other substances than culture antibiotics, for the purpose of identifying pure bacterial or fungus biochemical characteristics. Other relative motion control means may be employed, such as a threaded guide, in lieu of the angular grooves and ramps utilized in the instant invention. Other modifications and changes may be made without departing from the spirit of the invention.

The inventive test device affords control and standardization of several critical conditions during sensitivity testing. Uniform contact by disks impregnated with known quantities of antibiotic ensures proper diffusion across a culture. The disk holder arrangement establishes defined zones for each disk and its antibiotic. The disk holder motion control allows separation of the disks from the medium, and a second stage of testing using other reaction chemicals, applied to the disks or to the agar surface. The features of standardization, simplicity of procedure, and facile handling, inter alia, are realized by means of the instant invention.

What is claimed is:
1. A microbic test device comprising:
a plate for containing a culture medium;
a cover having a depending cylindrical side wall for close fit engagement of said plate;
a holder engaging said cover and for supporting a plurality of test elements in a planar array; and
means for controllably transporting said holder from engagement with said cover to said plate so that a plurality of said test elements are seated on the surface of said culture medium at substantially the same time and in uniform contact.

2. A microbic test device, as in claim 1, wherein said test elements comprise antibiotic disks.

3. A microbic test device, as in claim 2, wherein said holder is formed with an array of spaced spokes, and said disks are secured in receptacles at free ends of said spokes.

4. A microbic test device, as in claim 1, wherein said plate, cover and holder are cylindrical, said cover having a plurality of angular grooves in the wall of its cylinder, said holder having a like plurality of prongs formed on its periphery, and said plate having a like plurality of vertical slots, said grooves, prongs and slots being spaced substantially the same so that rotation of said cover relative to said plate moves said holder in a linear direction in accordance with the rotation.

5. A microbic test device, as in claim 3, wherein said disk receptacles are formed with cylindrical recesses for supporting said disks by close friction fit.

6. A microbic test device, as in claim 5, wherein said receptacles and said disks are formed with central apertures for allowing passage of inoculum through said apertures to said medium.

7. A microbic test device, as in claim 5, wherein at least one disk receptacle includes a projecting conical tip for securing said disk and for providing anaerobic contact with said medium.

8. A microbic test device, as in claim 5, wherein said receptacles are formed with spaced peripheral posts for positioning and supporting said disks.

9. A microbic test device, as in claim 3, wherein at least one of said spokes includes a plurality of receptacles.

10. A microbic test device, as in claim 3, wherein said spokes have different radial dimensions.

11. A microbic test device, as in claim 1, wherein said plate has indicators marked on its surface to provide a visual measure of test zones.

12. A microbic test device, as in claim 1, including a sealed, compartmented container, wherein said cover and holder are disposed in one compartment and said culture plate is disposed in a separate sealed compartment.

13. A microbic test device, as in claim 12, further including a liquid test broth, and inoculating elements in a separate compartment of said container.

References Cited

UNITED STATES PATENTS 3,010,880  11/1961  Littman et al. _____ 195—139

ALVIN E. TANENHOLTZ, Primary Examiner

U.S. Cl. X.R.

195—103.5